Figure 1:
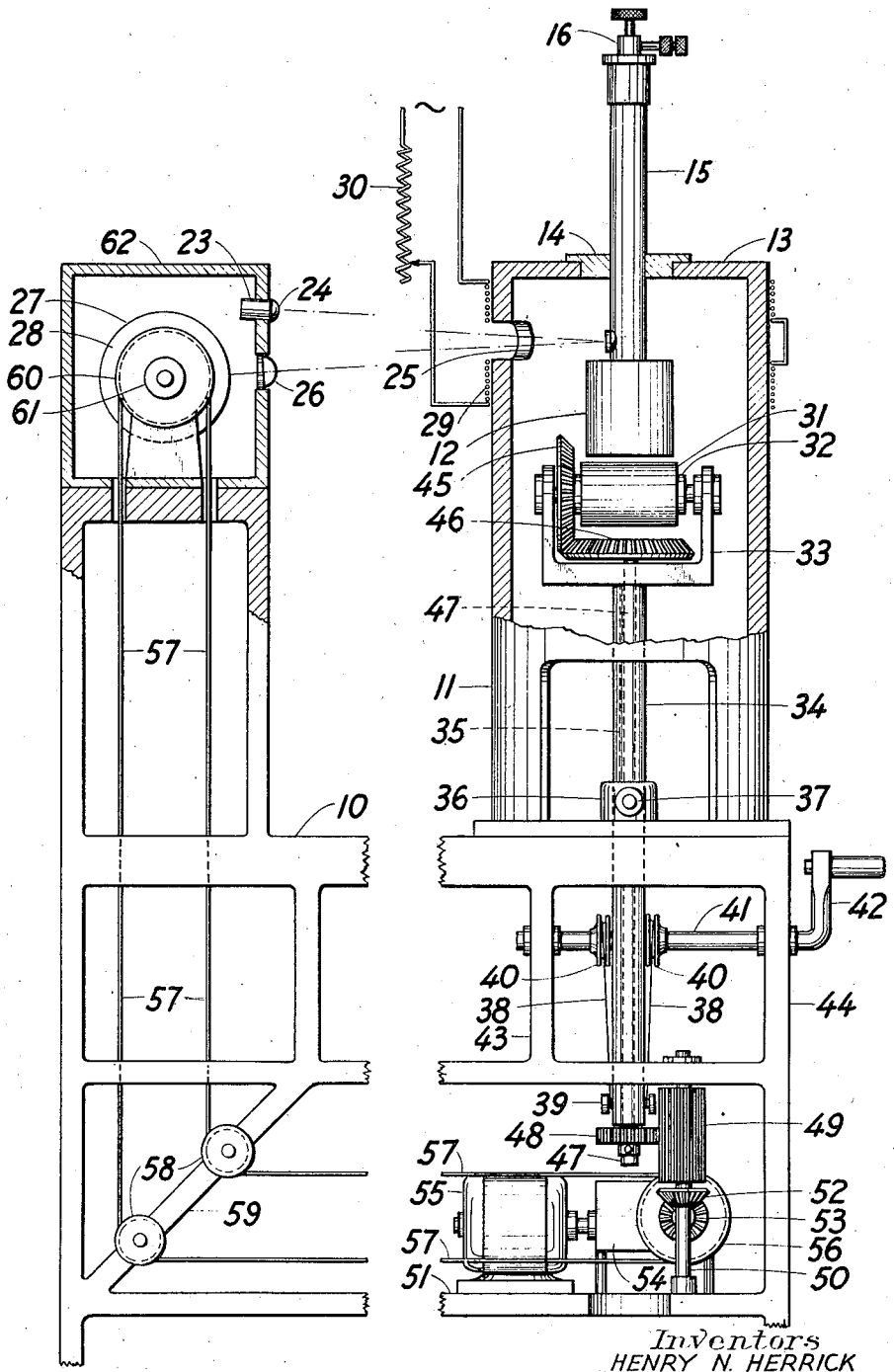

Patented Jan. 11, 1938

2,104,752

UNITED STATES PATENT OFFICE 2,104,752

METHOD AND MEANS FOR DETERMINING MAGNETIC POLARITY

Edward D. Lynton, Glendale, and Henry N. Herrick, Berkeley, Calif., assignors to Standard Oil Company of California, San Francisco, Calif., a corporation of Delaware Application January 25, 1937, Serial No. 122,164

10 Claims. (Cl. 175—182)

This invention relates to a method and means for determining the magnetic polarity of an object whose polarity is unknown, and particularly refers to a method and means for determining the polarity of samples or cores of material such as rock taken from the earth during the drilling of deep wells.

It has been proposed in United States Patent No. 1,792,639, issued February 17, 1931 to Henry N. Herrick, that samples or cores taken from the earth may be oriented and their original position determined by an investigation of their inherent magnetic properties, if the materials of which they are composed are even slightly magnetized. It has been found that, while the apparatus and method there disclosed for determining magnetic polarity are practical and operative, greatly improved results are obtained by the methods and means which constitute the subject matter of this invention, as will be described in the following paragraphs.

This invention comprehends broadly the determination of the magnetic polarity, or characteristics related thereto, of an object, such as a cylinder of rock commonly called a core, whose materials are so slightly magnetic that ordinary means of determining such characteristics are inoperative. Briefly this may be accomplished by placing the sample or core in a predetermined relation to the magnetic axis of a sensitive shielded magnetic system, or a system having the property of responding to an external magnetic field of low intensity, and slowly moving the sample about one of its axes, thereby causing a reaction upon the magnetic system that is susceptible of measurement. The results of this measurement may be used to determine the magnetic polarity or magnetic axis of the sample, and, by the further steps of the method of Patent 1,792,639, its original position in the earth and the dip and strike of the bedding planes may be made known. This has been found to be of incalculable advantage in orienting cores taken by rotary drilling methods, such as are in most common use in drilling deep wells for oil and gas.

This invention also comprehends an improved and simple means for carrying out the steps just outlined.

It is an object of this invention to provide a method and means for determining magnetic characteristics, such as the magnetic polarity of an object, for example, a sample of rock cored from the earth, and to correlate said polarity with respect to a given point or side of said core.

Another object is to provide an improved apparatus adapted to permit the practice of the methods of polarity determination to be described below.

Another object is to provide a recording apparatus that will be more completely responsive, rapidly operated and accurate than those devices heretofore used and disclosed for this purpose.

These and other objects and advantages of this invention will be more fully apparent from the following description of the method, and from the accompanying drawings, which form a part of this specification and illustrate a preferred embodiment of apparatus suitable for carrying out this invention.

In the drawings, Figure 1 is a vertical and part sectional view of a preferred apparatus suitable for practicing this invention, illustrating a core in place in a holder adapted to permit rotation about an axis parallel to the axis of the magnetically responsive system, as well as a suitable recorder for the resulting reaction between the two magnetic systems.

Figure 2:
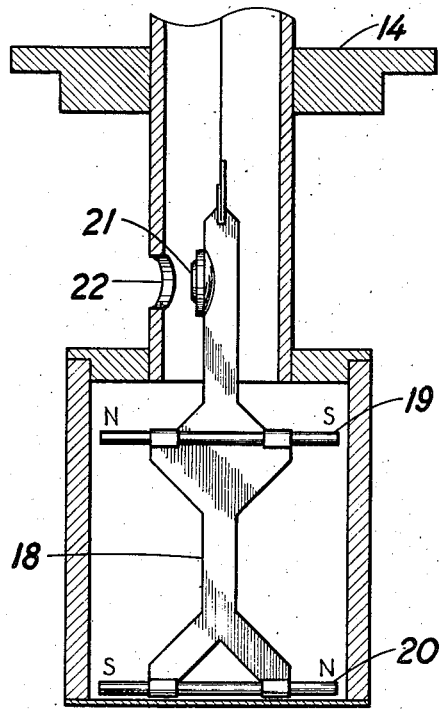

Figure 2 is a vertical sectional view of one form of magnetic system which may be used in the apparatus of Figure 1.

Referring to the drawings and particularly to Figure 1, the reference numeral 10 designates a base or support for the equipment to be described. A sensitive torsion magnetic balance or magnetometer generally designated 11 is located at one end of base 10 and comprises a magnetic system 12 substantially enclosed by a heavy cylindrical steel shield 13, the magnetic system being suspended by flange 14 so as to be removable from the shield 13, for a purpose to be described below. Shield 13 is designed to minimize so far as is practicable the disturbing effect on the magnetic system of the earth's field, electrical circuits, automobiles and the like.

The magnetic system that is preferred for this embodiment is shown in detail in Figure 2, and comprises a brass or other non-magnetic metal case 15, at the top of which is secured an adjustable suspension head 16 for a torsion wire 17 which in turn supports a light metal frame 18 holding permanent magnets 19 and 20. The latter are arranged to be astatic, as shown, and their principal magnetic axis is obviously coincident with their longitudinal axes. Case 15 should be of fairly heavy material, particularly in the lower part, so as to act as a damping means for the magnets 19 and 20. A small light mirror 21 is secured to the upper end of frame 18 and a hole 22 is provided in case 15 opposite the mirror to permit a beam of light to enter and be reflected therefrom, as shown, thereby giving an indication as to the amount of deflection of the astatic magnetic system 19—20.

Referring again to Figure 1, the left side of base 10 is extended upwardly to support the recording apparatus which, in this example, comprises a lamp 23 with a suitable lens system 24 to project a beam of light through opening 25 in shield 13 and opening 22 in case 15 to mirror 21, from which it is reflected back as shown through a semicylindrical lens 26 onto a sensitized paper chart 27 on recording drum 28.

In order to prevent shield 13 from accumulating a definite magnetic polarity, particularly adjacent the openings therein, a winding 29 of insulated wire is preferably placed about the shield, and is adapted to be connected with a suitable source of alternating current through rheostat 30. By this arrangement, any magnetic polarity accumulated by the shield 13 may be removed, by passing a suitable alternating current, say 60 cycles, through winding 29, and then gradually reducing the current by rheostat 30 to a low value, in the customary manner. During this operation it is essential that magnetic system 12 be removed from shield 13.

A preferred means for presenting the generally cylindrical core or sample 31 to the magnetic system 12 is shown in Figure 1 and comprises a rotatable chuck 32 mounted on a stationary head 33, the latter being supported on a vertically movable hollow shaft or tube 34, splined or keyed as at 35 to be non-rotatable. A boss 36 in the base of shield 13 is fitted with a clamp screw 37 to fix the shaft 34 and head 33 in the desired vertical position to hold the cylindrical core 31 close to the magnetic system 12. Shaft 34 is adjustably movable vertically by means of a pair of flexible cords or wires 38 secured to studs 39 at the bottom of shaft 34 and adapted to be wound around pulleys 40 on shaft 41 which is manipulated by any convenient rotatable means such as crank 42. Shaft 41 may be supported below bench 10 as by bracket 43 and leg 44.

The turning mechanism for rotating bevel gear 45 on chuck 32 to move core 31 in the desired controlled relation to magnetic system 12 comprises a complementary bevel gear 46, carried at the top of a rotatable vertical drive shaft 47, the latter extending through the center of hollow shaft 34. At the lower end of shaft 47 is a spur gear 48, which is adapted to mesh with a complementary gear 49 when the hollow shaft 34, carrying with it shaft 47, is raised to its upper or driving position shown in Figure 1. Gear 49 is preferably elongated so as to enable various diameters of cores 31 to be presented, and to permit various vertical spacings of the core from the magnetic system 12, according to the degree to which the cores may be magnetized.

Gear 49 is supported on a short vertical countershaft 50 which is suitably mounted for rotation in bracket 43 and brace 51. A bevel gear 52 on shaft 50 is adapted to be driven by a complementary bevel gear 53, mounted on speed reducer 54 to which is connected a small motor 55, preferably of the synchronous type. The ratio of the gear train just described is preferably such that the chuck 32 and core 31 are rotated about once in 30 minutes with respect to the axis of magnetic system 12.

In order to correlate the rotation of core 31 and the deflection caused by its reaction on the magnetic system and recorded by the light beam on chart 27, it is desirable to rotate chart holder 28 in synchronism with the core, thereby facilitating the interpretation of the curve traced on chart 27. In this example, the speed reducer 54 carries a pulley 56 adapted to drive a cord or spring wire belt 57, the latter passing around guide pulleys 58 on bracket 59 and thence around a pulley 60 on chart holder 28. The latter pulley is preferably loosely mounted on its shaft and is provided with a clamp nut 61 so that the chart edge may be adjusted to a definite given reference point on the core 31. A geared synchronizing shaft would be equally effective as the pulley and belt arrangement just described. It is also desirable that the chart holder 28 be housed or shielded as by an enclosure 62, to prevent fogging of the paper during operation.

In operation, a core or sample 31, which is customarily taken from the earth or substrata as a rough cylinder with its longitudinal axis in a vertical position, is ground to a true cylinder with sandpaper or other non-magnetic material, to avoid contamination, and is mounted in chuck 32. A reference point that can later be correlated with a similar reference point on the chart 27 is made on the core, and the upper end, i. e. the end of the core that was uppermost in the earth, is also designated for reasons which are obvious. The apparatus is preferably located in a room that can be darkened to sunlight and artificially illuminated with suitable colored light that will not affect the sensitized paper chart 27. The reference marks on the core 31 and chart 27 being correlated, lamp 23 is lighted and motor 55 is started. Core 31 is thereby slowly rotated about its longitudinal axis, which axis has been aligned to be substantially parallel with the normal longitudinal axis or magnetic axis of magnets 19 and 20. The core being very slightly polarized from its long period of exposure to the earth's magnetic field or from other causes, as discussed in more detail in the Herrick Patent 1,792,639 mentioned above, will react upon the magnetic system and cause a slight rotation of the system to one side or the other of the vertical axis formed by the torsion wire 17. The direction of this rotation will be determined by the arrangement of the magnets, core, etc., and is best determined for any particular instrument by making tests of cores whose polarity is known as from a mechanical orientation.

The magnetic axis of the core 31 will obviously be roughly diametral due to its substantially vertical position in the earth, i. e. a line of S poles will be substantially effective along one side of the cylinder from the top to the bottom thereof, and a line of N poles will be substantially effective along the other side of the cylinder in a similar manner. Thus the direction of the magnetic lines of force of the core's magnetic field is roughly transverse to its longitudinal or cylindrical axis, although the orientation of said lines with respect to a given point on the core circumference is as yet unknown. It has been proposed previously, in the earlier Herrick Patent 1,792,639, to place the core at one side of one end of a sensitive magnetometer and rotate the core about an axis at right angles to the magnet axis but this mode of operation has been found inferior and less accurate than that disclosed herein, where the axis of core rotation is positioned to be substantially parallel to the axis of the magnetic system so that first one and then the other effective magnetic pole of the core is presented parallel to the effective length of the magnetic system. Such a mode results in a greatly increased deflection reading and correspondingly greater reliability of results.

Because of the diversity of shapes of curves that will be traced upon chart 27 and the variation in the arrangement of magnet polarity and placement, direction of core rotation, etc., it is impractical to give detailed instructions as to interpretation of the charts. The best instruction to one skilled in the art is to compare the curves of cores of known orientation with those of unknown orientation and note their points of similarity thereby identifying their N and S axis.

The essential feature of this invention is thus believed to be a mode of determination of magnetic polarity of a slightly polarized object, and particularly, though not necessarily, a well core or sample, involving placing the polarized object in the influence of a known magnetic field in such position that the magnetic lines of force of the known magnetic field are substantially at right angles to magnetic lines of force of the polarized object, rotating the polarized object slowly about an axis substantially parallel to the magnetic axis of the magnetic system, and measuring the reaction set up between the two magnetic systems during said rotation. In the present example the reaction is measured by noting the deflection of the magnetic system 12 from its normal position.

Although but one mode of procedure and a specific form of apparatus for carrying it out have been described in this specification it is obvious that many changes could be made in both without departing from the scope of the following claims. Consequently all such modifications and changes as may be made within the scope of such claims are embraced thereby.

We claim:

1. A method of determining the magnetic polarity of a body of weakly magnetized material having a generally known magnetic axis arrangement, comprising the steps of placing said body within the influence of a magnetic system of known magnetic characteristics in such a position that the magnetic lines of force of the known magnetic system are substantially at right angles to the magnetic lines of force of the weakly polarized object, rotating said object about an axis substantially parallel to the magnetic axis of said magnetic system, and measuring the reaction between the two magnetic systems during said rotation.

2. A method of determining the magnetic polarity of a cylindrical body of weakly magnetized material having a magnetic axis generally diametral, or transverse with respect to its longitudinal axis, comprising the steps of placing said body within the influence of a magnetic system of known characteristics and with the longitudinal axis of said body substantially parallel to the magnetic axis of said system, rotating said body about its longitudinal axis and measuring the reaction between said magnetic fields during said rotation.

3. A method of determining the magnetic polarity of a cylindrical body of weakly magnetized material having a magnetic axis generally diametral or transverse with respect to its longitudinal axis, comprising the steps of placing said body within the influence of a magnetic system of known characteristics and with the longitudinal axis of said body substantially parallel to the magnetic axis of said system, rotating said body about its longitudinal axis, recording the reaction between said magnetic fields during said rotation and identifying on said body the polarity of the magnetic axis as defined by said record.

4. A method of determining the magnetic polarity of a cylindrical core or sample taken from a substantially vertical well bore comprising the steps of placing said core within the influence of a magnetic system of known characteristics and with the longitudinal axis of said core parallel to the principal magnetic axis of said system, rotating said body about its longitudinal axis, measuring the resulting reaction between the two magnetic systems, and identifying the polarity thus determined on said cylindrical core.

5. An apparatus for determining the magnetic polarity of a body of weakly magnetized material comprising means responsive to a weak magnetic field and having a principal magnetic axis, means for supporting said body adjacent said first named means, means for rotating said support means about an axis substantially parallel to the principal magnetic axis of said first named means, and means for measuring the reaction of said weakly magnetized body on said first named means.

6. An apparatus for determining the magnetic polarity of a body of weakly magnetized material comprising a movable magnetic system, means for supporting said body adjacent said system, means for rotating said support means about an axis substantially parallel to the magnetic axis of said magnetic system, and means for measuring the movement of said system.

7. An apparatus for determining the magnetic polarity of a body of weakly magnetized material according to claim 6, in which said last named means comprises a movable recorder and means for synchronizing the motion of said recorder with said support rotating means.

8. An apparatus for determining the magnetic polarity of a body of weakly magnetized material according to claim 6, in which said magnetic system comprises a plurality of astatically mounted permanent magnets, and said support means is adapted to support said body closer to one of said magnets than to the others.

9. An apparatus for determining the magnetic polarity of a body of weakly magnetized material comprising two vertically spaced astatically arranged permanent magnets forming a magnetic system, suspension means for said magnets to permit rotation thereof in a horizontal plane, means for supporting said body below the lower of said magnets whereby the magnetic fields of said body and said magnetic system will react to cause movement of said magnetic system, means for rotating said body about an axis parallel to the axis of said lower magnet, and means for recording the position of said magnetic system during said rotation.

10. An apparatus for determining the magnetic polarity of a body of weakly magnetized material according to claim 9 in which said last named means comprises a chart and means for moving said chart in synchronism with the rotation of said body.

EDWARD D. LYNTON.
HENRY N. HERRICK.